United States Patent [19]
Colin

[11] Patent Number: 4,666,521
[45] Date of Patent: May 19, 1987

[54] CEMENTATIOUS ADMIXTURES AND METHOD

[75] Inventor: Laurence Colin, Cross River, N.Y.

[73] Assignee: Cem Tech Laboratories Inc., New Milford, Conn.

[21] Appl. No.: 783,868

[22] Filed: Oct. 3, 1985

[51] Int. Cl.$^4$ ............................................... C04B 7/02
[52] U.S. Cl. ......................................... 106/97; 106/98
[58] Field of Search .................................... 106/97, 98

[56] References Cited

U.S. PATENT DOCUMENTS

| | | | |
|---|---|---|---|
| 3,558,335 | 1/1971 | Messenger | 106/97 |
| 4,111,711 | 9/1978 | Kiehl et al. | 106/97 |
| 4,144,078 | 4/1979 | Colwell | 106/97 |
| 4,321,243 | 3/1982 | Cornwell et al. | 423/268 |
| 4,501,830 | 2/1985 | Miller et al. | 106/90 |
| 4,505,753 | 3/1985 | Sheetz et al. | 106/90 |

FOREIGN PATENT DOCUMENTS 59-227762 12/1984 Japan ................................ 106/97

OTHER PUBLICATIONS

*Concrete Construction*, vol. 30, No. 4, pp. 327–331, Apr., 1985.

Primary Examiner—William R. Dixon, Jr.
Assistant Examiner—Steven Capella
Attorney, Agent, or Firm—Eugene Lichenstein

[57] ABSTRACT

A Cementatious admixture for use either as a mortar, cement or concrete when added to water comprising a hydraulic cement, such as Portland cement, in combination with presized inorganic filler particles having a maximum particle size of about 50 microns and in a predetermined relationship by weight to the Portland cement. The added water must also satisfy a relationship to the weight of hydraulic cement to provide thixotropy and nondilatency.

25 Claims, 4 Drawing Figures

CEMENTATIOUS ADMIXTURES AND METHOD

FIELD OF INVENTION

This invention relates to cementatious admixtures for masonry cement and concrete and to a method for forming a nondilatent thixotropic admixture for use as a mortar cement or concrete, respectively.

BACKGROUND OF THE INVENTION

Masonry cement, commonly referred to as mortar, is a cement composition prepared for use by masons in accordance with the standards of the American Society for Testing and Materials (ASTM) or its equivalent in foreign countries. The basic constituent of mortar is an hydraulic cement such as portland cement to which is added hydrated lime, fine graded aggregate such as sand and water.

Mortar is used as the bedding material in unit masonry and for coating, parging and plastering of concrete blocks and brick walls. Mortar is also used for stuccoing vertical surfaces. To satisfy the ASTM requirements, the components of mortar when mixed together must provide certain working and handling requirements of which the following are the most important: workability, plasticity, water retentivity, green strength and cohesiveness.

Present day masonry mortars depend upon the lime component in the mixture to achieve, in particular, the degree of workability and plasticity required by the ASTM standards. However, the use of hydrated lime will reduce the compressive strength of the mortar and cause efflorescence. The latter is attributable to leaching of calcium hydroxide and/or its salts and its presence will substantially reduce the aesthetics of the masonry structure. In addition, hydrated lime is alkaline in pH and can cause skin and eye irritation. Because of the caustic properties of calcium hydroxide and the environmental dangers from the leaching of lime salts, the building trades have long sought an inexpensive masonry cement composition without lime.

Similarly, concrete is formed from an admixture of cement, aggregate and water. As in mortar, the cement component must be an hydraulic cement, such as portland cement, which reacts upon contact with water to form an insoluble bond with the aggregate particles. Thus if the aggregate contains only natural or manufactured sand, the mixture is called a mortar composition and if the aggregate contains both sand and gravel, the mixture is called concrete. Manufactured sand is defined in ASTM C-144 for use in masonry mortar as the product obtained by crushing stone, gravel or air-cooled iron blast furnace slag specially processed to assure particle shape as well as gradation. The aggregate should be graded in accordance with sieve size with no particles of less than 150 microns (No. 100 sieve) present when natural sand is used as the aggregate.

The physical properties of cured mortar and concrete depend on the water-cement ratio and the degree of hydration of the cement. The components of the mortar or concrete are combined with water to form an admixture in the form of a paste. During parging of the mortar or laying of block or brick slumping or sagging of the mortar can occur. This is due to dilatency and lack of thixotropy in the mixture. During casting or pouring of concrete some bleeding of water to the top surface may occur. The degree to which the mix gives off free water is a measure of the dilatency of the admixture. Dilatency is exhibited by separation of the fine particles of portland cement and fine aggregate particles permitting the lighter particles to rise to the top surface with the free water and with the heavier particles, i.e., coarse aggregate settling to the bottom. The dilatency of the admixture results in an alteration in the water cement ratio which, in turn, affects the cure properties and will result in a flawed product.

SUMMARY OF THE INVENTION

It has been discovered in accordance with the present invention that a cementatious admixture for use as a mortar, cement or concrete can be formed which is substantially nondilatent by intermixing presized inorganic filler particles of less than a predetermined maximum size with portland cement and water in accordance with a predefined minimum weight ratio between the presized filler particles and the portland cement and in accordance with a minimum weight ratio of water to filler particles. When used as a mortar or concrete, conventional aggregate such as natural sand may be added to the cementatious admixture with the water content appropriately adjusted to a desired consistency preferably to within a predetermined percentage range of the total composition. The cementatious admixture of the present invention requires no lime and substantially increases the compression strength, workability, cohesiveness and plasticity of the admixed mortar, cement and concrete respectively.

The cementatious admixture of the present invention broadly comprises an hydraulic cement preferably portland cement in combination with presized inorganic filler particles having a maximum particle size of about 50 microns and in a relationship by weight of: $C/2 \leq F$, where C represents the hydraulic cement and F represents the presized filler particles; with the combination adapted to be mixed with water in a minimum proportion of $F = H_2O$ by weight in addition to particles of aggregate whereby a substantially nondilatent mortar, cement or concrete is formed corresponding to the volume proportion and characteristic of the additional aggregate particles.

The method of forming a substantially nondilatent cementatious admixture in accordance with the present invention broadly comprises: intermixing portland cement with presized inorganic filler particles having a maximum particle size of about 50 microns in accordance with a minimum weight ratio of filler particles to portland cement of 0.5, adding water to the mixture in a proportion wherein the filler particles by weight are at least equal to the weight of the water and adding particles of aggregate in a desired proportion by volume relative to the portland cement and filler particles corresponding to the use of the admixture as a mortar, cement or concrete respectively, and with the water content of the admixture adjusted to provide a consistency in accordance with such use.

OBJECTS OF THE INVENTION

It is a primary object of the present invention to formulate an inexpensive cementatious admixture for a masonry cement which does not require the inclusion of hydrated lime but otherwise passes all of the ASTM standards and has compressive strength, workability and plasticity characteristics superior to the conventional lime mortar cement compositions.

It is a further object of the present invention to formulate a cementatious admixture for use as a concrete composition.

It is an even further object of the present invention to provide a method for forming a nondilatent cementatious admixture for use as a mortar, cement and concrete respectively.

BRIEF DESCRIPTION OF THE DRAWINGS

Other objects and advantages of the present invention will become apparant from the following description of the invention when read in conjunction with the accompanying drawings of which.

DETAILED DESCRIPTION OF THE INVENTION

Figure 1:
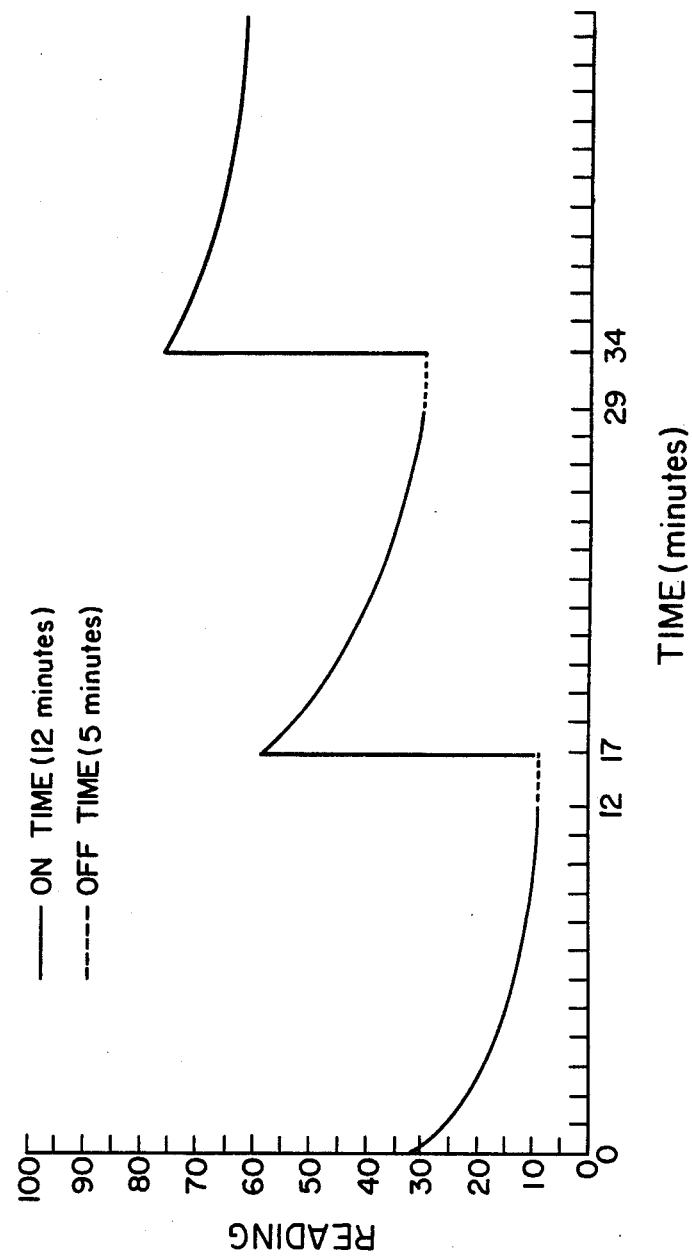
FIG. 1 is a curve of a typical viscosity characteristic of a portland cement and water mixture with respect to time.

Referring now more particularly to FIG. 1 which illustrates the typical viscosity characteristic of a portland cement and water mixture. The viscosity measurements were taken using a conventional Brookfield viscometer of the RV type with a number four spindle at a number 20 speed and at a factor of 100. A type II portland cement was used in a 3 to 1 portland to water by volume mix. The reading values are merely a relative indication used to plot the characteristic curve. The curve would be substantially identical in characteristic for any portland cement to water ratio which would permit the cement to gel. As indicated on the time reference, the machine was consecutively recycled for a twelve minute "on" period and then for a five minute "off" period. Each time the machine was turned on the measurement would rise to a higher level than the preceding cycle and descend to a relatively constant level substantially higher than the constant level reached in the preceding cycle. This characteristic is typical of a conventional cement and water mixture which can be classified as being nonthixotropic. Thixotropy is the property of a liquid or gel that is characterized by loss of viscosity under stress in which the original viscous state is regained upon removal of the stress. Accordingly, to be truly thixotropic, the readings should be substantially repeatable cycle to cycle, i.e., repetitive cycles should exhibit hysterisis. It is hypothesized in accordance with the present invention that the reason for the lack of hysterisis in existing admixtures of cementatious materials is due to the dilatency of the mixture. Once stress is applied, free water is released from the mixture which is not reabsorbed even upon the removal of such stress. Thus in each consecutive cycle the material contiguous to the spindle becomes more viscous due to settling of the heavier aggregate particles.

It was discovered in accordance with the present invention that a portland cement water mixture can be made to respond in a truly thixotropic manner by the addition of inorganic filler particles of below a predetermined maximum size and in a predetermined minimum proportion by weight to the portland cement. The ratio of presized filler particles to portland cement must satisfy the following relationship: $F \geq P/2$ where F is the minimum requirement by weight of the presized inorganic filler particles and P is the weight of the portland cement.

As indicated by the above formula the minimum quantity of presized inorganic filler particles must represent at least 50% of the weight of the portland cement. There is no maximum to the relative percentage of filler particles to portland cement provided the portland concentration in the admixture satisfies minimum portland requirement levels as set by the ASTM for a mortar, cement and concrete respectively. Once the minimum requirement for F is satisfied a mortar cement or concrete may be formed with the addition of conventional aggregate as will be further elaborated on later in the specification. It is, however, critical, as indicated hereinbefore, that the size of the inorganic filler particles F be below a predetermined maximum size of about 50 microns, preferably below 44 microns and optimally below 38 microns.

Figure 2:
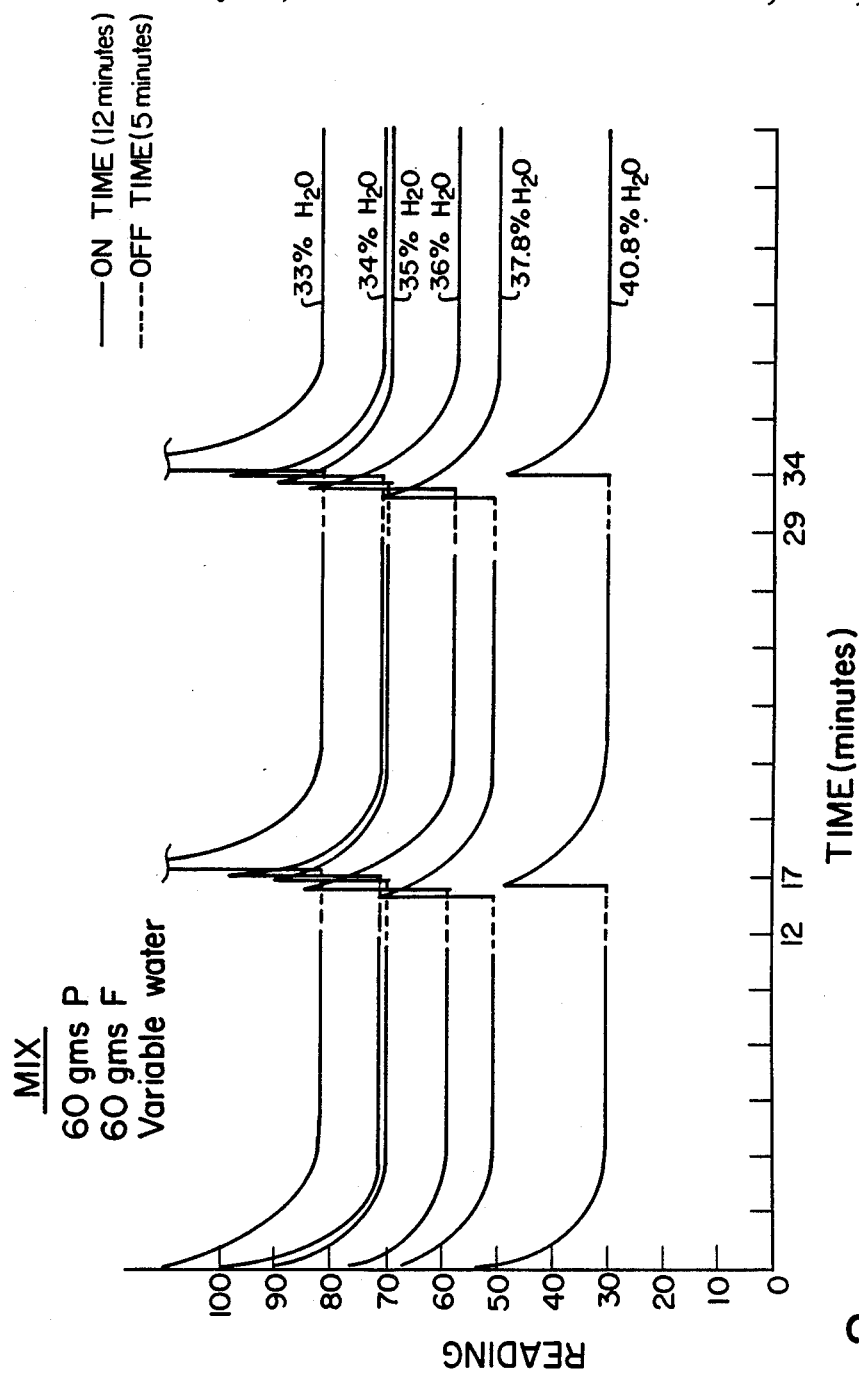
FIG. 2 is a family of curves showing the viscosity characteristic relative to time for a portland cement admixture containing presized inorganic filler particles of silica selected in accordance with the present invention and water with the content of water varied as a percentage of the total composition.
Figure 3:
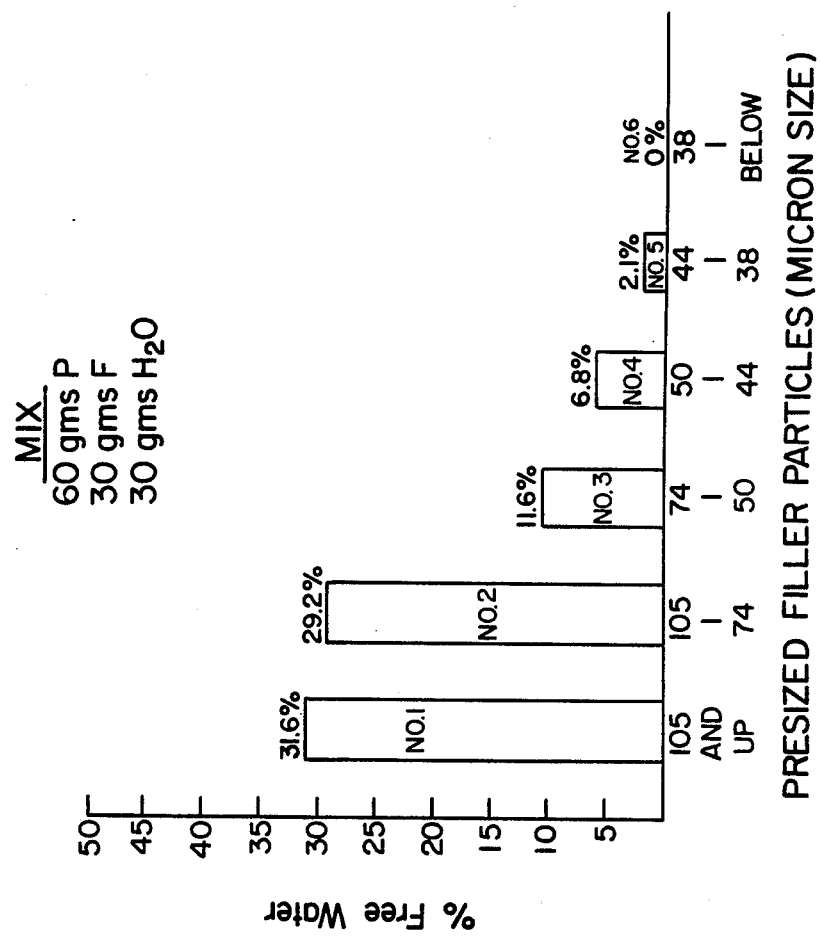
FIG. 3 shows a bar graph illustrating the degree of dilatency for an admixture of portland cement, water and presized inorganic filler particles of silica at different maximum particle size levels.

When the admixture of portland cement and presized inorganic filler particles satisfies the above indicated ratio requirement between portland and filler particles and the filler particles satisfy the maximum particle size requirement, then the admixture in the presence of water will be both thixotropic and nondilatent in characteristic. FIG. 2 shows a family of curves for a mixture of portland cement and presized filler particles in a one to one by weight ratio with water added at different percentage levels. The curve shows a truly thixotropic viscosity characteristic for the admixture independent of the percentage of water. FIG. 3 indicates the degree of dilatency, in terms of the percentage of free water given off, for an admixture of portland cement, water and inorganic filler particles at different maximum particle size levels. In each case the admixture consisted of 60 grams of portland cement, 30 grams of different size particles of silica and 30 grams of water. The admixture was stirred in a mixer under identical conditions and allowed to settle. The free water was then poured out and weighed to establish the percent of free water given off. In example No. 1, the maximum size of inorganic filler particles was established by screening inorganic particles of silica using a conventional No. 140 sieve which allows particles smaller than 105 microns in size to pass through it. The particles which were trapped by the sieve, i.e., larger than 105 microns in size were then used in the example No. 1 test. It should be understood that "fine" aggregate as used in mortar is recommended in the ASTM C-144 standard for use in gradations between a No. 100 sieve and a No. 4 sieve with no more than 2-25% of the gradation represented by the No. 100 sieve. Accordingly, the particles used in example No. 1 represent particles smaller in size than what is presently considered in the trade for fine aggregate particles of natural sand. Nonetheless, the admixture of example No. 1 is highly dilatent. In example No. 2 the particles were sized between 74 and 105 microns, i.e., between a No. 140 sieve and a No. 200 sieve. The admixture was still extremely dilatent. The degree of dilatency drops off precipitously as the maximum size of the filler particles decrease. The degree of dilatency drops to zero for a maximum particle size of below 38 microns. However, the degree of dilatency for size particles between 44 microns and 38 microns is only 2.1% and for between 44 and 50 microns is 6.8%. Therefore, for practical purposes the maximum size for the presized inorganic filler particles to be used in accordance with the present invention will be defined as about 50 microns with 44 microns being the preferred maximum size and 38 microns the optimum maximum size.

The particle size requirement for the presized filler should not be confused with the filler ratio requirement relative to the portland cement. Both requirements are critical to the present invention to form a nondilatent admixture for use as a mortar, cement or concrete respectively. Although a portand cement type II was used in FIGS. 1–4, the invention is equally applicable to a portland cement type I and is believed to be applicable to other hydraulic cements.

Any conventional inorganic filler material preferably a mineral filler and most preferably silica (silicon dioxide) may be used for the presized inorganic filler particles. Natural sand which has been presized in accordance with the present invention is the preferred choice. Other conventional inorganic filler particles include alumina, calcium carbonate, calcium sulfate, calcium metasilicate, magnesium silicate, barium sulfate, mica and synthetic inorganic particles such as for example "Zeeospheres" a trademark product of Zeeland Industries of St. Paul, Minnesota.

Although only the maximum particle size is critical to the present invention, it is preferred that the particles be at least above micron size, i.e., above about one micron as opposed to the submicron or microsilica size particles. As the size particles get smaller, they occupy less volume and are lighter. Accordingly, many more particles are required to satisfy the criteria of the present invention. Since particles at 38 microns will perform as well as particles of one micron in size, it is far less expensive to use the larger particles up to the maximum permitted size than smaller size particles. The actual choice is based on cost. However, it should be kept in mind that inorganic filler particles such as natural sand are not commercially available in uniform sizes but rather in graded sizes below a maximum designated size. Accordingly, silica particles presently available at e.g., 5 microns in size in reality contain a major proportion of micro size particles, i.e., below one micron in size. The present invention does not limit the gradation in particle size but places a premium on larger micron size particles up to the maximum permitted size i.e., the preferred range should include a major percentage of the particles between about 1 to about 50 microns in size with 50 microns being the approximate upper limit.

The structure of the silica particle is not material to the present invention. However, silica with a crystalline structure is preferred over the noncrystalline amorphous structure sometimes called condensed silica fume primarily because of cost and size distinctions.

The amount of water added to form a cementatious admixture is very important as is well known to those skilled in this art. In accordance with the present invention there is in fact a minimum concentration of water to satisfy the minimum requirements for a mortar, cement or concrete in which the weight of the filler particles equal the weight of the added water.

To prepare a mortar cement or concrete in accordance with the present invention all that need be added t the cementatious admixture is an aggregate as conventionally understood by those skilled in the art and as used in accordance with ASTM standards. To distinguish between aggregate and the inorganic filler particles of the present invention the latter term will be used with the prefix "presized" whereas the former is intended to designate conventional particulate filler material substantially free of organic matter such as natural sand alone or in combination with crushed stone or gravel. It should, however, be understood that the presized filler particles may be used as a substitute for aggregate particles but such would not be prudent primarily from a cost basis and also from differences in physical properties and workability.

Accordingly, assuming only the minimum required amount of presized filler particles are used to form the mortar cement or concrete admixture of the present invention then when making a mortar aggregate should be added in a volume proportion of about 1:.5:3 for a portland cement presized filler particle to aggregate ratio with an ideal ratio of 1:1:3 and a maximum ratio of 1:1:6. For cement and concrete the volume proportion should be about 1:1:3 for a similar ratio of portland cement, presized filler particles and aggregate with an ideal ratio of 1:2:3 and a maximum ratio of 12:6. For concrete, gravel should be incorporated in the aggregate.

The concentration of water in the mortar cement or concrete admixture should be adjusted for proper consistency depending upon usage. Preferably, the concentration of water for mortar should fill in a range by weight of the total composition of 13 to 7.4% with an optimum range of 14.3 to 15.6%. For a cement admixture the water content should preferably lie in a range of between 13.9 to 17.1% with an optimum range of 15 to 16%.

Figure 4:
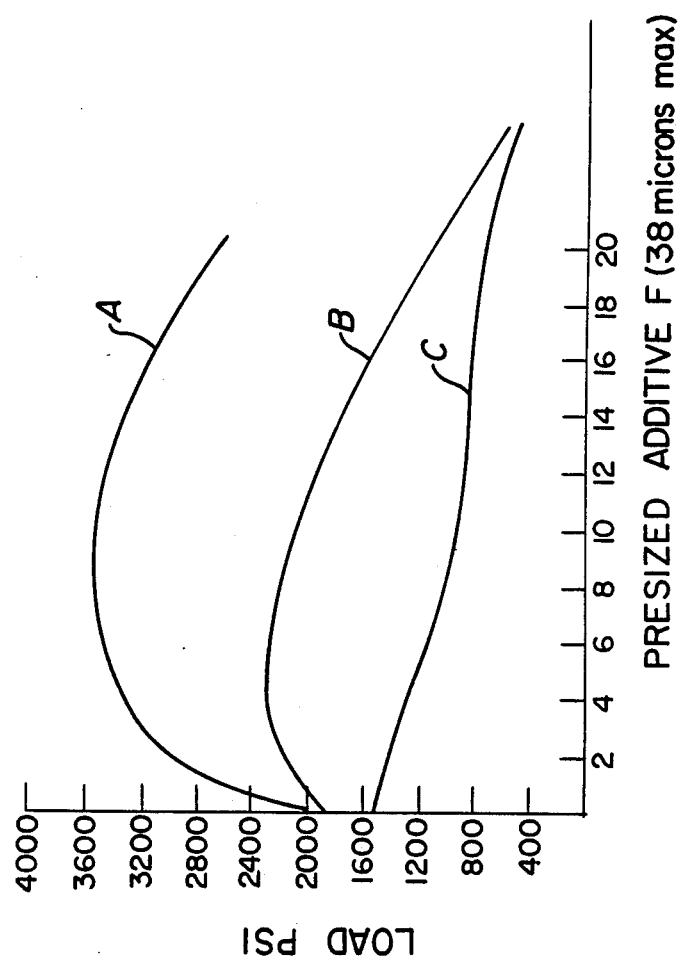
FIG. 4 shows a comparison between the compressive strength characteristic for a typical masonry cement composition of portland cement and aggregate with increasing levels of presized inorganic filler particles of silica relative to an identical composition in which the amount of natural sand is increased to correspond to the increase by weight of presized filler particles.

To substantiate the advantages of the cementatious admixture of the present invention relative to a conventional admixture without presized inorganic filler particles and to a similar conventional admixture containing lime successive compressive load tests were made of portland and sand admixtures containing increasing amounts of presized filler particles compared to identical admixtures with similarly increasing amounts of natural sand and lime. The results are shown by the curves of FIG. 4. The basic mixture for each test point of curve A was a mixture of 20 grams portland to 60 grams of a natural sand aggregate to which was added at 2 gram intervals presized filler particle of maximum 38 microns size. The mixture at each level was allowed to set and a standard compressive load test was made after a 7-day moisture curve. Curve B was formed by incrementally adding 20 grams of natural sand aggregate to an identical basic portland to natural sand aggregate mixture under otherwise identical conditions. Curve C was formed by incrementally adding 2 grams of lime to an identical mixture for comparative purposes. The compressive strength of the cementatious admixture of the present invention is substantially higher than the strength of a similar admixture with natural aggregate and even that much greater than a similar admixture with lime.

What is claimed is:

1. A cementatious admixutre for use either as a mortar, cement or concrete when added to water respectively, comprising: a hydraulic cement in combination with particles of aggregate and presized inorganic filler particles having a maximum particle size of about 50 microns and in a relationship by weight of: $C/2 \leq F$ where C represents the weight of the hydraulic cement and F represents the weight of the presized filler particles, with the combination adapted to be mixed with water in a minimum proportion of $F = H_2O$ by weight such that a substantially thixotropic, nondilatent cementatious mixture is formed.

2. A cementatious admixture as defined in claim 1 wherein said hydraulic cement is portland cement.

3. A cementatious admixture as defined in claim 2 wherein said presized inorganic filer particles are selected from the class consisting of silica, calcium carbonate, calcium sulfate, magnesium silicate and mica.

4. A cementatious admixture as defined in claim 3 wherein said presized inorganic filler particles are silica of the natural sand type.

5. A cementatious admixture as defined in claim 4 wherein said presized inorganic filler particles have a maximum particle size of 44 microns.

6. A cementatious admixture as defined in claim 4 wherein said presized inorganic filler particles have a maximum particle size of 38 microns.

7. A cementatious admixture as defined in claim 4 wherein said presized filler particles include a major proportion of particles between about 1 to 50 microns in size.

8. A cementatious admixture as defined in claims 3 or 6 wherein said portland cement, presized filler particles and particles of aggregate are in a volume proportion of about 1:0.5:3 for forming a mortar.

9. A cementatious admixture as defined in claim 8 wherein said volume proportion is 1:1:3.

10. A cementatious admixture as defined in claim 8 wherein said volume proportion is 1:1:6.

11. A cementatious admixture as defined in claim 9 wherein the concentration of water lies in a range between 13 and 17.5% by weight of the total mortar admixture.

12. A cementatious admixture as defined in claim 3 or 6 wherein said portland cement, presized filler particles and particles of aggregate are present in a volume ratio proportion of about 1:1:3 forming a cement and concrete.

13. A cementatious admixture as defined in claim 12 wherein said volume proportion is about 1:2:3.

14. A cementations admixture as defined in claim 12 wherein said volume proportion is 1:2:6.

15. A comentatious admixture as defined in claim 13 wherein the concentration of water lies in a range between 13.9 and 17.1% of the total cement admixture.

16. A method of forming a substantially nondilatent cementatious admixture comprising the steps of:
   intermixing portland cement with presized inorganic filler particles having a maximum particle size of about 50 microns and relationship by weight of $P/2 \leq F$ where P represents the weight of the portland cement and F represents the weight of the presized filler particles;
   adding water to the mixture in a proportion wherein the filler particles by weight are at least equal to the weight of the water; and
   adding particles of aggregate for forming either a mortar, cement or concrete respectively.

17. A method as defined in claim 16 wherein the water content of the admixture is adjusted to provide a consistency in accordance with the use of the admixture.

18. A method as defined in claim 17 wherein the water content of the admixture is between 13 and 17.4%.

19. A method as defined in claim 17 wherein the water content of the admixture is between 13.9 and 17.1% by weight of the total admixture for use as a cement.

20. A method as defined in claim 18 wherein said components are incorporated in the admixture in a proportion by volume of about 1:0.5:3 of portland to presized filler particles to aggregate.

21. A method as defined in claim 18 wherein said components are incorporated in the admixture in a proportion by volume of about 1:1:3 of portland to presized filler particles to aggregate.

22. A method as defined in claim 19 wherein said components are incorporated in the admixture in a proportion by volume of about 1:1:3 of portland to presized filler particles to aggregate.

23. A method as defined in claim 18 wherein said components are incorporated in the admixture in a proportion by volume of about 1:1:6 of portland cement to presized filler particles to aggregate.

24. A method as defined in claim 23 wherein said components are incorporated in the admixture in a proportion by volume of about 1:2:3 of portland to presized filler particles to aggregate.

25. A method as defined in claim 24 wherein said components are incorporated in the admixture in a proportion by volume of about 1:2:6 of portland to presized filler particles to aggregate.

* * * * *